United States Patent [19]

Mayne et al.

[11] Patent Number: 4,512,001
[45] Date of Patent: Apr. 16, 1985

[54] METHOD AND APPARATUS FOR SEISMIC EXPLORATION USING NONLINEAR SWEEPS

[75] Inventors: W. Harry Mayne; Sasson Zilkha, both of Houston, Tex.

[73] Assignee: Geosource Inc., Houston, Tex.

[21] Appl. No.: 585,032

[22] Filed: Mar. 6, 1984

Related U.S. Application Data

[63] Continuation of Ser. No. 310,829, Oct. 13, 1981, abandoned.

[51] Int. Cl.³ .................... G01V 1/28; G01V 1/113
[52] U.S. Cl. ............................. 367/189; 181/113; 181/119; 181/121; 73/662
[58] Field of Search ............... 367/189; 73/662; 181/112-121, 401

[56] References Cited

U.S. PATENT DOCUMENTS 4,248,324  2/1981  Mifsud ........................... 181/121
4,293,935  10/1981 Gros et al. ...................... 367/189

OTHER PUBLICATIONS

Werner et al, "Combisweep—A ... Techniques", 6/77, pp. 78-105, E. A. E. Mtg., Zagreb.
Lerwill, "Seismic Sources on Land", 1979, pp. 115-141, Appl. Sci. Pub.
Broding, "The Continuous Sweep Vibroseis Method", 4/24/70, pp. 595-600, OTC 1205.
Advertising Brochure—Texas Instruments, "Vibrator Control System", Copyright ©1980.
Advertisement—"Optimize Vibrator Operations with New VCS III Vibrator Control System", printed in Geophysics, Jun. 1981 issue.

Primary Examiner—Nelson Moskowitz
Attorney, Agent, or Firm—Arnold, White & Durkee

[57] ABSTRACT

The claimed invention is directed to seismic exploration wherein an earth surface vibrator sweeps through a frequency range with varies with time as a function of frequency.

2 Claims, 7 Drawing Figures

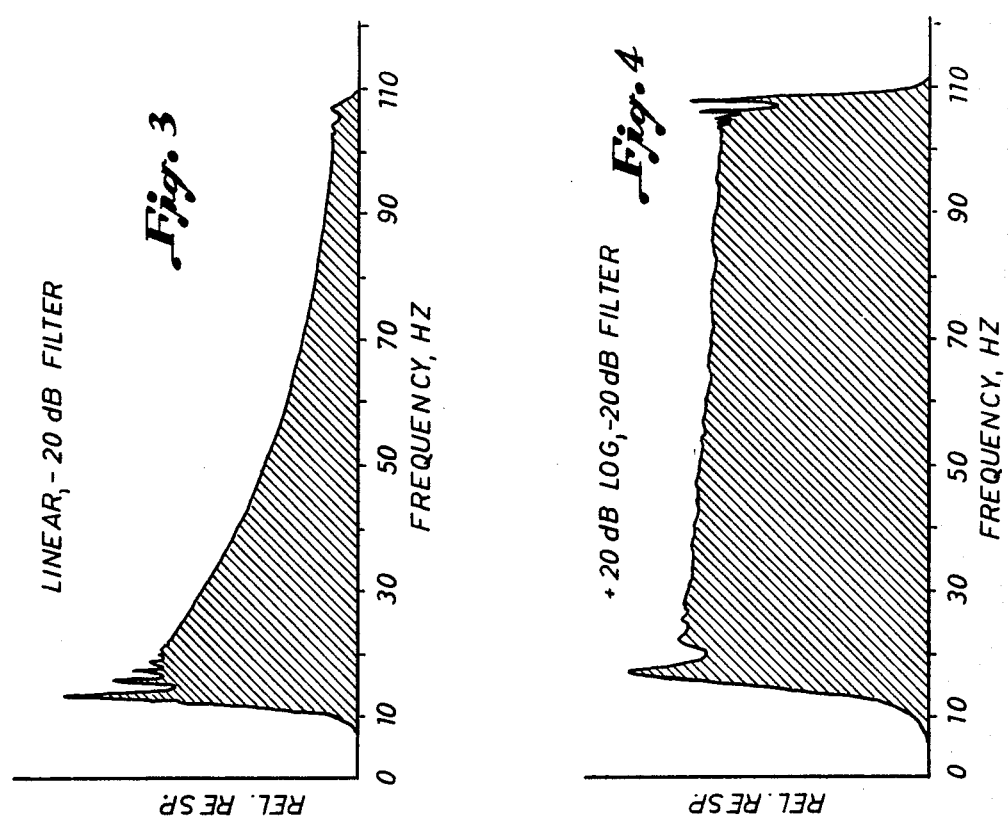

METHOD AND APPARATUS FOR SEISMIC EXPLORATION USING NONLINEAR SWEEPS

This application is a continuation of application Ser. No. 310,829, filed Oct. 13, 1981, now abandoned.

BACKGROUND OF THE INVENTION

1. Field of the Invention

The present invention relates to method and apparatus for seismic exploration, and, more particularly, to providing a nonlinear sweep signal to a vibrator in a seismic system.

2. Description of the Prior Art

In seismic exploration, seismic waves are commonly used to probe the earth's crust as a means of determining the type and location of subsurface formations. The earth's crust can be considered a transmission medium or filter whose characteristics are to be determined by passing seismic waves through that medium. In the reflection seismic method, seismic waves or impulses are generated at a point at or near the earth's surface, and the compressional mode of these waves is reflected from subsurface acoustic impedance boundaries and detected by arrays of seismic detectors located at the earth's crust. The seismic detectors convert the received waves into electrical signals which are sensed and recorded in a form which permits analysis. Skilled interpreters can discern from such an analysis the shape and depth of subsurface reflection boundaries and the likelihood of finding an accumulation of minerals, such as oil and gas.

Various sources of seismic energy have been utilized in the art to impart the seismic waves into the earth's crust. Such sources have included dynamite and weight-drop apparatus.

Another source of seismic energy is a vibrator which, when energized, imparts relatively low level energy signals into the earth's crust. Typically, the impartation of energy with vibrator devices is for a preselected energization interval, and data are recorded during the energization interval and a subsequent "listening" interval.

Often it is desirable for the vibrator to impart energies of varying frequencies into the earth's crust during the energization interval. In such instances, energy at a starting frequency is first imparted into the earth, and the frequency of energization changes over the energization interval at some rate until the stopping frequency is reached at the end of the interval. The difference between the starting and stopping frequencies of the sweep generator is known as the range of the sweep, and the length of time in which the generator has to sweep through those frequencies is known as the sweep time.

Vibrators typically employ a sweep generator, and the output of the sweep generator is coupled to the input of the vibrating type device. The output of the sweep generator dictates the manner in which the frequency of the energization signal which is imparted into the earth's crust varies as a function of time.

Several methods of effecting the rate of change of the frequency of the sweep generator during the sweep time have been proposed. For example, in the case of a linear sweep, the frequency output of the sweep generator changes linearly over the sweep time at the rate dictated by the starting and stopping frequencies and the sweep time. Further, nonlinear sweeps have been proposed in which the rate of change of the frequency of the sweep generator varies nonlinearly between the starting and stopping frequencies over the sweep time. Examples of nonlinear sweeps have been quadratic sweeps and square root sweeps.

It is known in the seismic exploration art that the higher frequencies of energization signals are attenuated to a greater degree than lower frequency energization signals, and most authorities have concluded that the attenuation of the earth in decibels is directly proportional to the frequency of the energization signal. Further, the total attenuation of any specific signal is known to be dependent upon the velocity, layering, thickness and attenuation coefficients of each layer traversed, as well as the frequency range.

Even though the earth attenuation is known to increase with increasing frequency of the energization signals, linear sweeps have been extensively used in vibrators. Techniques for emphasizing the lower amplitude higher frequency responses are well-known and have been employed to account for the attenuation applied to these higher frequency seismic signals by the earth.

Nonlinear sweep signals have been suggested but have not achieved acceptance by the industry due to poor performance.

The shortcomings of the prior art are overcome with the method and apparatus of the present invention.

SUMMARY OF THE INVENTION

In accordance with the present invention, a method of seismic exploration is provided wherein an optimal nonlinear sweep signal is presented to the source of vibrating seismic energy.

In accordance with the method of the present invention, at least one array of seismic detectors is established at a location on the earth's surface and at least one vibrator is also established on the earth's surface. The vibrator includes a sweep generator, which generates an output signal. The output signal of the sweep generator is nonlinear, and preferably, varies as a function of time during the sweep time as follows:

$$F_0 + 0.43429 \frac{R}{C} \left[ \ln \frac{(2.3026 C A_0 t + 1)}{R} \right]$$

where:

t is the instantaneous value of time during the sweep in seconds;

$F_0$ is the frequency at which the sweep starts in Hz;

R is the range of frequencies over which the sweep varies during the sweep time;

$A_0$ is the initial rate of change of frequency with respect to time; and

C is the logarithm to the base 10 of the ratio of the response at high frequency to the response at low frequency. C is chosen to provide compensation for any attenuation which exists to a particular impedance boundary over the range R.

In one embodiment wherein the starting frequency of the sweep is 10 Hz, the stopping frequency of the sweep is 110 Hz, the sweep time is 10 seconds, and the attenuation of the earth is a total of 20 db, the frequency of the sweep signal which will exactly compensate for this attenuation, varies over the sweep time as follows:

$$10 + 43.43 \ln (0.9t + 1).$$

In accordance with the present invention, a method of generating an output signal of a predetermined shape is also provided. The method comprises dividing the sweep time of the output signal into a plurality of preselected time intervals. The method also comprises calculating the rate of change of the frequency of the output signal for each time interval to realize said predetermined shape based on the range of the sweep, the sweep time, the starting frequency of the sweep and the predetermined shape of the output signal. The signals representative of the rate of change of the output frequency are then fed to a frequency generator, which generates the output signal.

BRIEF DESCRIPTION OF THE DRAWINGS

In the accompanying drawings:

FIG. 1 is a pictorial diagram which illustrates component parts of a seismic exploration system.

FIG. 2 is a block diagram of some of the component parts of the vibrator depicted in FIG. 1.

FIG. 3 is a graphical illustration of an experimental frequency response using a linear sweep.

FIG. 4 is a graphical illustration of an experimental frequency response using a nonliner sweep in accordance with the present invention.

DESCRIPTION OF PREFERRED EMBODIMENTS

Figure 5:
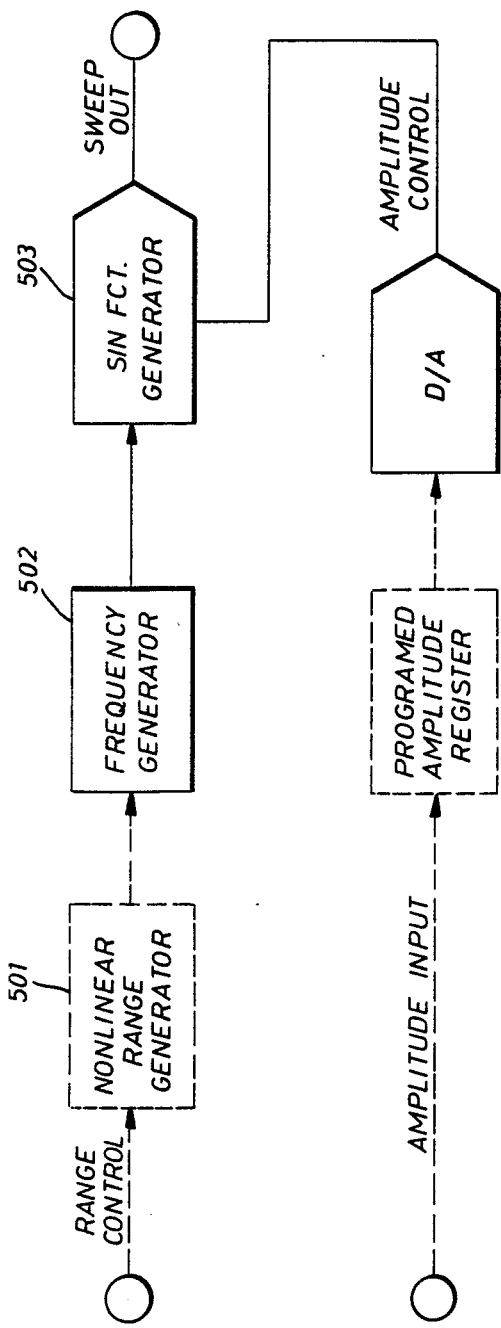
FIG. 5 is an electrical schematic in block diagram form of apparatus for generating a nonlinear sweep signal.

It will be appreciated that the present invention can take many forms and embodiments. Some embodiments of the invention are described so as to give an understanding of the invention. It is not intended, however, that the embodiments described herein should in any way limit the true scope and spirit of the invention.

Referring first to FIG. 1, portions of a seismic exploration system are illustrated. As shown, the system comprises a plurality of seismic arrays 101. Each seismic array 101 contains a plurality of seismic detectors 102. The seismic arrays 101 are preferably located at regularly spaced intervals along the earth's surface.

The system illustrated in FIG. 1 also includes recording cable 104, which is preferably a multi-pair of cable. A pair of wires 103 is "taken out" of cable 104 and is connected to the output of each seismic array 101. Electrical signals generated by the seismic detectors 102 in seismic arrays 101 are conveyed via the multi pair of cable 104 to recording truck 105, where appropriate field recording of the signals takes place.

The system illustrated in FIG. 1 also includes a source of seismic energy, which is shown as vibrator 107. Periodically, vibrator 107 imparts low-level seismic waves into the earth. The seismic arrays 101 produce electrical signals in response to the reflected portions of the seismic waves, and the electrical signals are then conveyed to recording truck 105.

Now referring to FIG. 2, there are portions of the elements of vibrator 107 of FIG. 1 are illustrated. Vibrator 107 includes sweep generator 201, hydraulic valve 202, hydraulic piston 203 and vibrator base plate 204. The output signal from sweep generator 201 is fed to hydraulic valve 202, which is preferably a solenoid-actuated valve. Based on the input signal received from sweep generator 201, hydraulic valve 202 controls the movement of hydraulic piston 203, which is turn drives the vibrator base plate 204. Vibrator base plate 204 is in contact with the earth and imparts seismic energy into the earth's crust responsive to the movement of hydraulic piston 203.

In many applications where vibrator units are utilized as the source of seismic energy, energy is inputted into the earth during an energization interval of time, and seismic data are recorded during the energization interval and for a listening interval following the energization interval. During the energization interval, the frequency of the input energy is often varied over a range of preselected values. For example, vibrator 107 may input energy at a frequency of 10 Hz at the start of the energization interval, and may change the input frequency at some preselected rate over the energization interval. The difference between the stopping and starting frequencies is known as the range of the sweep, and the length of the energization interval is known as the sweep time.

As noted above, it is well-known in the seismic industry that the higher frequencies in a seismic signal are subject to greater earth attenuation than the lower ones and that this attenuation is decibels is directly proportional to the frequency. Thus, the higher frequencies inputted in the earth's crust by vibrator 107 will suffer more attenuation that the lower frequency signals inputted by vibrator 107.

In accordance with the present invention, sweep generator 201 is designed to provide a nonlinear signal to hydraulic valve 202 to provide nonlinear control of the frequencies inputted into the earth by vibrator 107, as vibrator 107 sweeps through the range of frequencies which are to be inputted at any given time. Preferably, the frequency of the output signal from sweep generator 201 varies as a function of time during the sweep as follows:

$$F_0 + 0.43429 \frac{R}{C}\left[\ln\left(\frac{2.3026 \, CA_0 t}{R} + 1\right)\right] \quad (1)$$

where:

t is the instantaneous value of time during the sweep in seconds;

$F_0$ is the frequency at which the sweep starts in Hz;

R is the range of frequencies over which the sweep varies during the sweep time;

$A_0$ is the initial rate of change of frequency with respect to time; and

C is the logarithm to the base 10 of the ratio of the response at high frequency to the response at low frequency. We have discovered that the value of C may be chosen to provide compensation for any attenuation which exists to a particular acoustic impedance boundary over the range R.

In a specific embodiment where the frequency of the signals inputted into the earth are to vary between 10 Hz and 110 Hz over a sweep time of 10 seconds and assuming that the attenuation of the earth is a total of 20 db between 10 Hz and 110 Hz, the frequency of the output signal from sweep generator 201, which will exactly compensate for this attenuation, varies over the sweep time as follows:

$$10 + 43.43 \ln [0.9t + 1].$$

For the example given above, experimental responses have been generated for not only the instance where the output signal of sweep generator 201 is linear, but also for the instance where the output signal from sweep generator 201 is in accordance with the generalized logarithmic expression above. The experimental results for the linear sweep are shown in FIG. 3, while the experimental results for the logarithmic sweep are shown in FIG. 4. It will be observed that, with the logarithmic sweep, the relative frequency response is substantially flat over the range of frequencies in question. Thus, with the method of the present invention, the frequency response over the range of frequencies in the sweep is markedly improved, and compensation for earth attenuation has been obtained.

In accordance with the present invention, apparatus is also provided for generating a nonlinear signal at the output of a sweep generator. Referring to FIG. 5, such apparatus includes nonlinear range generator 501, frequency generator 502 and sine function generator 503. Nonlinear range generator 501 inputs signals representative of the rate of change which is required in the frequency of the SWEEP OUT signal. The rate of change of frequency signals are provided at preselected time intervals during the sweep. Frequency generator 502 responds to the rate of change in frequency signals to produce output signals representative of the new frequency. Sine function generator 503 converts the digital output of frequency generator 502 to an analog signal of the desired frequency at its output (SWEEP OUT).

A significant feature of the apparatus of the present invention is that nonlinear range generator 501 provides rate of change of frequency signals to frequency generator 502. By this technique, relatively smooth transistions in the frequency of SWEEP OUT are realized. On the other hand, prior attempts to provide a nonlinear output have attempted to provide change in frequency information to the sweep generator. With this latter approach, smooth transitions in output frequency have not been achieved.

Figure 6:
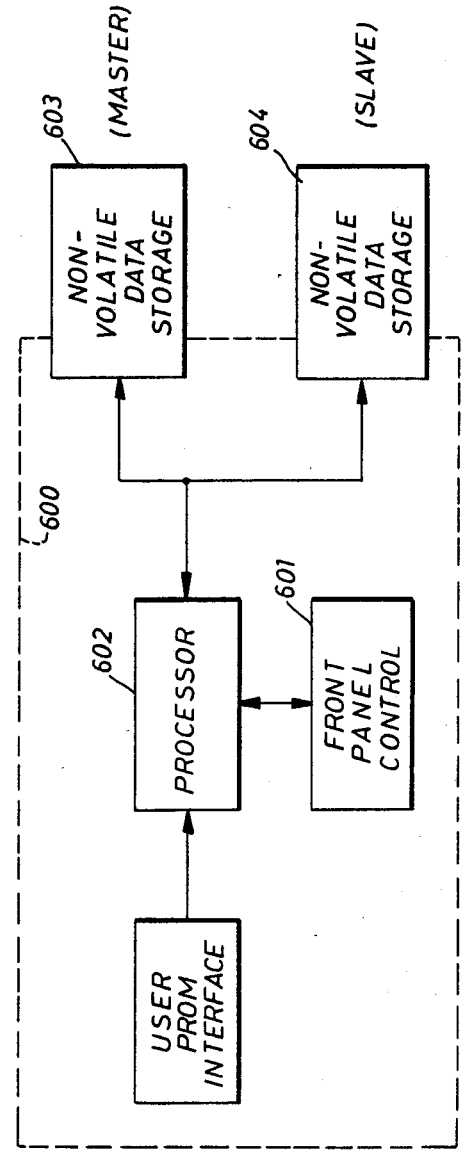
FIG. 6 is an electrical schematic in block diagram form of a programmer apparatus.

Referring now to FIG. 6, the rate of change of frequency signals over the sweep are generated as follows. Programmer 600 includes processor 602 and front panel control 601. The values of the starting frequency of the sweep, the range of the sweep, the sweep time, and the desired shape of the nonlinear output are programmed in front panel control 601. Processor 602 reads this programmed information. Processor 602 also divides the sweep time into small intervals of time, and in a preferred embodiment, these intervals of time are four milliseconds. For each four millisecond interval, processor 602 calculates the rate of change of frequency required to realize the desired output of the sweep generator. The rate of change of frequency is then stored in non-volatile storage device 603, which is preferably an electrically erasable programmable read only member (EEPROM) card. Preferably, the EEPROMs of non-volatile memory storage device 603 has a storage capacity of 4,096, eight-bit words. The contents of non-volatile storage device 603 thus contains the information necessary for the SWEEP OUT signal to move from the starting frequency to the stopping frequency in the sweep time according to the nonlinear function desired. Preferably, the non-linear function realized is as set forth in expression (1) above.

Figure 7:
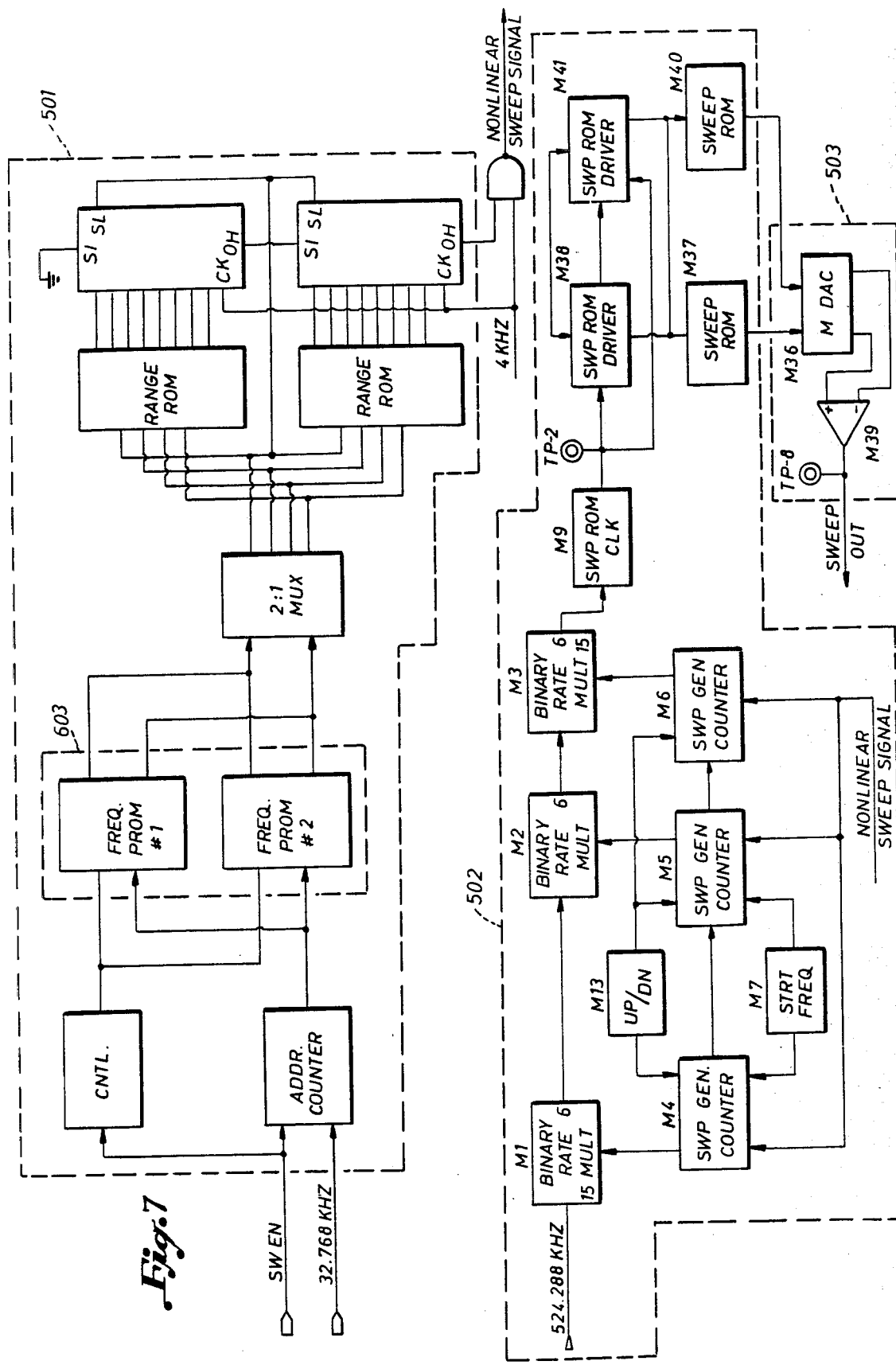
FIG. 7 is a more detailed electrical schematic of portions of the circuitry illustrated in FIGS. 5 and 6.

Now referring to FIG. 7, there is illustrated a detailed implementation of the nonlinear range generator 501, frequency generator 502 and sine function generator 503 of FIG. 5.

What is claimed is:

1. A method of seismic exploration, comprising the steps of:
   establishing at least one seismic array at a location on the earth's surface, each said seismic array containing seismic detectors;
   establishing at least one vibrator at a location on the earth's surface, each said vibrator having the capability of sweeping through a range of frequencies during a preselected sweep time and each said vibrator including a sweep generator;
   generating an output signal from the sweep generator which varies as a function of time during the sweep time as follows:

$$F_0 + 0.43429 \frac{R}{C} \left[ \ln \frac{(2.3026 C A_0 t + 1)}{R} \right]$$

where:
   t is the instantaneous value of time during the sweep in seconds;
   $F_0$ is the frequency at which the sweep starts in Hz;
   R is the range of frequencies over which the sweep varies during the sweep time;
   $A_0$ is the initial rate of change of frequency with respect to time,
   C is the logarithm to the base 10 of the ratio of the response at high frequency to the response at low frequency, where C is chosen to provide compensation for any attenuation which exists to a particular impedance boundary over the range R,
   receiving seismic data with the arrays of detectors located on the earth's surface; and
   recording the received seismic data.

2. The method of claim 1, wherein the frequency of the sweep signal varies from 10 Hz to 110 Hz during a sweep time of 10 seconds, and wherein the output signal from the sweep generator varies as a function of time during the sweep time as follows:

$$f_s(t) = 10 + 43.43 \ln [0.9t + 1],$$

in order to compensate for an earth attenuation of 20 decibels over the frequency range of 10 to 110 Hz.

* * * * *

UNITED STATES PATENT AND TRADEMARK OFFICE
CERTIFICATE OF CORRECTION

PATENT NO. : 4,512,001
DATED : April 16, 1985
INVENTOR(S) : W. Harry Mayne and Sasson Zilkha It is certified that error appears in the above-identified patent and that said Letters Patent is hereby corrected as shown below:

In column 2, line 45, please delete the equation $$F_0 + 0.43429 \frac{R}{C}\left[\ln \frac{(2.3026 C A_0' + 1)}{R}\right]$$

and in its place insert the equation $$F_0 + 0.43429 \frac{R}{C}\left[\ln \left(\frac{2.3026 C A_0'}{R} + 1\right)\right]$$

In claim 1, column 6, line 31, please delete the equation $$F_0 + 0.43429 \frac{R}{C}\left[\ln \frac{(2.3026 C A_0' + 1)}{R}\right]$$

and in its place insert the equation $$F_0 + 0.43429 \frac{R}{C}\left[\ln \left(\frac{2.3026 C A_0'}{R} + 1\right)\right]$$

Signed and Sealed this

Twenty-second Day of October 1985

[SEAL]

Attest:

DONALD J. QUIGG

Attesting Officer

*Commissioner of Patents and Trademarks—Designate*